Reissued Aug. 18, 1953 Re. 23,702

UNITED STATES PATENT OFFICE 23,702

1-CARBALKOXY-4-SUBSTITUTED PIPERAZINES

Richard Joseph Turner, Fanwood, and Hugh Wendell Stewart, Plainfield, N. J., assignors to American Cyanamid Company, New York, N. Y., a corporation of Maine No Drawing. Original No. 2,535,971, dated December 26, 1950, Serial No. 54,816, October 15, 1948. Application for reissue December 31, 1952, Serial No. 329,153

5 Claims. (Cl. 260—268)

Matter enclosed in heavy brackets [ ] appears in the original patent but forms no part of this reissue specification; matter printed in italics indicates the additions made by reissue.

This invention relates to new organic compounds and their preparation. More particularly it relates to 1-carbalkoxy-4-substituted piperazines.

The 1-carbalkoxypiperazines of the present invention may be illustrated by the following general formula:

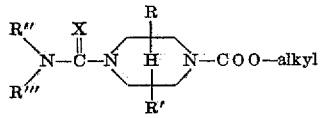

wherein R and R′ are members of the group consisting of hydrogen and lower alkyl radicals, R″ and R‴ are hydrogen and aliphatic radicals and X is a member of the group consisting of oxygen, sulfur, and imino radicals. As used herein, the term "lower alkyl" radical means a radical of 1 to 4 carbon atoms.

In general, the compounds of the present invention are solids, white to tan in color. In some cases the compounds may take the form of an oil. The compounds are in general slightly soluble in water but readily soluble in benzene, lower aliphatic alcohols, isopropyl acetate and the like. Where X is the imino radical, water soluble addition salts may be formed.

The preparation of the new compounds of the present invention may be accomplished in several ways dependent to a large extent on the nature of the product desired. We prefer to prepare the compounds by reacting a 1-carbalkoxypiperazine having the formula:

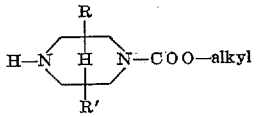

wherein R and R′ are as previously defined or addition salts of such piperazines with any compound which is capable of introducing into the 4-position of the piperazine nucleus a group represented by

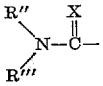

wherein R″ and R‴ and X are as previously defined. As starting material, we can use compounds such as 1-carbethoxypiperazine; 1-carbethoxy-2,5-dimethylpiperazine; 1-carbethoxy-2,6-dimethylpiperazine; 1-carbethoxy-3,5-dimethylpiperazine; 1-carbomethoxypiperazine; 1-carbomethoxy-2,5-dimethylpiperazine; 1-carbomethoxy-2,6-dimethylpiperazine; 1-carbomethoxy-3,5-dimethylpiperazine, and the like. In a reaction of this type wherein a halogen acid is liberated, it is usually desirable to have present an acid binding substance such as an alkali metal bicarbonate, alkali metal carbonate, or the like.

As intermediates to be reacted with the 1-carbalkoxypiperazines, we can use an alkali metal cyanate or a mono- or dialkylcarbamyl chloride to produce the 1-carbalkoxy-4-carbamylpiperazines. In producing 1-carbalkoxy-4-thiocarbamylpiperazines, we can use as intermediates [an alkali metal thiocyanate,] an aliphatic isothiocyanate or a mono- or dialkylthiocarbamyl chloride. The guanyl derivatives of 1-carbalkoxypiperazines may be prepared by two methods; (1) by the reaction of a 1-carbalkoxypiperazine salt with a cyanamide, and (2) by the reaction of a 1-carbalkoxypiperazine with an S-alkylisothiourea salt. A suitable solvent in carrying out either process is water or aqueous alcohol.

The reaction, in general, is preferably carried out in solution, although it can be carried out as a fusion process. Temperatures of 20° to 110° C. are usually sufficient to complete the reaction in a reasonable time when water is used as the solvent. Generally, the reaction is carried out at 20° to about 80° C. when aqueous alcoholic solvents or hydrocarbon solvents, such as benzene, are used. The conditions under which the reaction is carried out are dependent both upon the group being introduced into the 4-position and upon the reactivity of the 1-carbalkoxypiperazine. [For instance, 1-carbethoxypiperazine hydrochloride can be treated in aqueous solution with potassium thiocyanate at room temperature to give 1-carbethoxy-4-thiocarbamylpiperazine; when trans-1-carbethoxy-2,5-dimethylpiperazine hydrochloride is treated under similar conditions, no appreciable amount of trans - 1 - carbethoxy - 4 - thiocarbamyl - 2,5-dimethylpiperazine is produced. The latter may be obtained, however, by the heating of trans-1-carbethoxy-2,5-dimethylpiperazine hydrochloride without an added solvent in the presence of potassium thiocyanate to the fusion point of the mixture.]

Some of the compounds in the present application are active antifilarial agents and may be useful in the treatment of filariasis. Other compounds produce sedation in animals stimulated with an agent such as ephedrine, and still other compounds show analgesic activity. In general, the compounds are characterized by their relatively low toxicity.

The following examples show in greater detail the preparation of illustrative 1-carbalkoxy-4-substituted piperazines within the scope of the present invention.

[Example 1]

[To a solution of 19.4 parts of 1-carbethoxypiperazine in 25 parts of water is added 9.7 parts of potassium thiocyanate, and the reaction mixture is allowed to stand for about four hours. It is then evaporated under reduced pressure to a viscous residue. On the addition of 16 parts of absolute ethyl alcohol to the residue, a white solid forms. This solid is separated by filtration and the ethanol filtrate is then evaporated. On chilling, a solid residue is obtained. The solid is further purified by recrystallization from isopropyl acetate. The product, 1-carbethoxy-4-thiocarbamylpiperazine, melts at 109.0°–110.5° C.]

Example 2

A solution of 82 parts of potassium cyanate in 75 parts of water is added to a solution of 195 parts of 1-carbethoxypiperazine hydrochloride in 125 parts of water. After standing at room temperature for twenty-four hours, the mixture is evaporated to dryness. The residue is extracted with 400 parts of absolute ethanol, acidified with hydrochloric acid and then it is evaporated to about 125 parts of ethanol. On cooling, the product crystallizes from solution. The precipitate, after isolation, is further purified by recrystallization from ethanol using activated charcoal. A yield of 146 parts of 1-carbethoxy-4-carbamylpiperazine, melting at 161°–162° C., is obtained.

Example 3

To a solution of 63.3 parts of 1-carbethoxypiperazine in 175 parts of benzene there is slowly added at 35°–40° C., with cooling and stirring, 34.8 parts of ethyl isothiocyanate. The mixture is stirred at refluxing temperature for one-half hour. The benzene solution is concentrated and the product is precipitated by the addition of petroleum ether. On recrystallization from a mixture of isopropyl acetate and petroleum ether, the product, 1-carbethoxy-4-ethylthiocarbamylpiperazine, melting at 91°–91.5° C., is obtained.

Example 4

To a solution of 56 parts of trans-1-carbethoxy-2,5-dimethylpiperazine in 50 parts of water is added concentrated hydrochloric acid until the solution is slightly acidic to Congo red paper. Then 24.3 parts of solid potassium cyanate is added and the mixture is stirred until all the potassium cyanate dissolves. After standing for twenty-four hours, the product is separated by filtration. On crystallization from carbon tetrachloride, the product, trans-1-carbethoxy-4-carbamyl-2,5-dimethylpiperazine, melting at 118.5°–119.5° C., is obtained.

The intermediate, trans-1-carbethoxy-2,5-dimethylpiperazine, may be prepared from ethyl chlorocarbonate and trans-2,5-dimethylpiperazine by the method described by Moore, Boyle and Thorn, Journal of the Chemical Society, 39 (1929). It distills at 112° at 10 mm.

[Example 5]

[To a solution of 56 parts of trans-1-carbethoxy-2,5-dimethylpiperazine in 210 parts of absolute ether is added anhydrous hydrogen chloride until the reaction mixture is acidic to Congo red paper. The hydrochloride salt obtained is isolated by filtration, ground and mixed well with 32 parts of potassium thiocyanate. The mixture is then heated at 130° C. for five minutes. The reaction becomes slightly exothermic at about 110° C. After cooling, the reaction product is slurried in boiling isopropyl acetate, the potassium chloride is removed by filtration and the filtrate is diluted with petroleum ether. On cooling, trans-1-carbethoxy-2,5-dimethyl-4-thiocarbamylpiperazine is obtained which has a melting point of 94.5°–05° C.]

Example 6

To a solution of 78 parts of ethyl alcohol in 100 parts of water are added 41.8 parts of S-methylisothiourea sulfate and 56 parts of trans-1-carbethoxy-2,5-dimethylpiperazine. The reaction mixture is refluxed on a steam bath until the evolution of methyl mercaptan ceases. The reaction mixture is dehydrated by azeotropic distillation with benzene. The resulting solid, trans-1-carbethoxy-2,5-dimethyl - 4 - guanylpiperazine sulfate, may be further purified by crystallization in the usual manner.

Example 7

A solution of 18.5 parts of 1-diethylcarbamylpiperazine in 80 parts of benzene is added to 10.8 parts of ethyl chlorocarbonate and 10.6 parts of sodium carbonate and the reaction mixture refluxed for 15 hours. The white solid obtained is separated from the reaction mixture by filtration and the filtrate evaporated under reduced pressure. The viscous residue obtained is distilled under reduced pressure to give 1-carbethoxy-4-diethylcarbamylpiperazine which boils at 179° C. at 7 mm. pressure.

We claim:

1. A 1-carbalkoxypiperazine having the general formula:

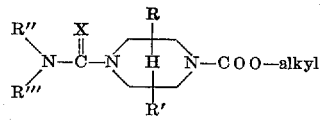

wherein R and R′ are members of the group consisting of hydrogen and lower alkyl radicals, R″ and R‴ are members of the group consisting of hydrogen and alkyl radicals, and X is a member of the group consisting of oxygen, sulfur and imino radicals, *and R″ and R‴ are not simultaneously hydrogen when X is sulfur.*

2. A 1-carbalkoxypiperazine having the general formula:

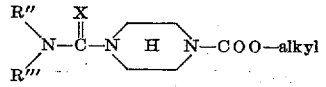

wherein R″ and R‴ are members of the group consisting of hydrogen and alkyl radicals, and X is a member of the group consisting of oxygen, sulfur and imino radicals, *and R″ and R‴ are not simultaneously hydrogen when X is sulfur.*

3. A 1-carbalkoxy-4-dialkylthiocarbamylpiperazine having the general formula:

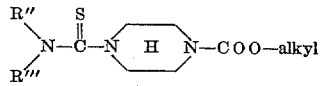

in which R″ and R‴ are alkyl radicals.

[4. The compound 1-carbethoxy-4-thiocarbamylpiperazine having the following formula:

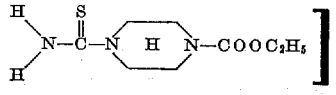

]

5. The compound 1-carbethoxy-2,5-dimethyl-4-guanylpiperazine having the following formula:

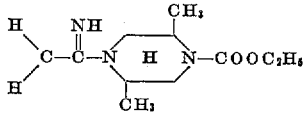

6. The compound 1-carbethoxy-4-diethylcarbamylpiperazine having the following formula:

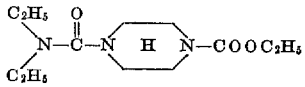

RICHARD JOSEPH TURNER.
HUGH WENDELL STEWART.

References Cited in the file of this patent or the original patent

UNITED STATES PATENTS

| Number | Name | Date |
|---|---|---|
| 2,415,785 | Buck | Feb. 11, 1947 |
| 2,415,787 | Buck | Feb. 11, 1947 |
| 2,467,893 | Kushner | Apr. 19, 1949 |
| 2,467,894 | Kushner | Apr. 19, 1949 |
| 2,467,895 | Kushner | Apr. 19, 1949 |
| 2,472,496 | Steward | June 7, 1949 |